United States Patent Office 3,483,416
Patented Dec. 9, 1969

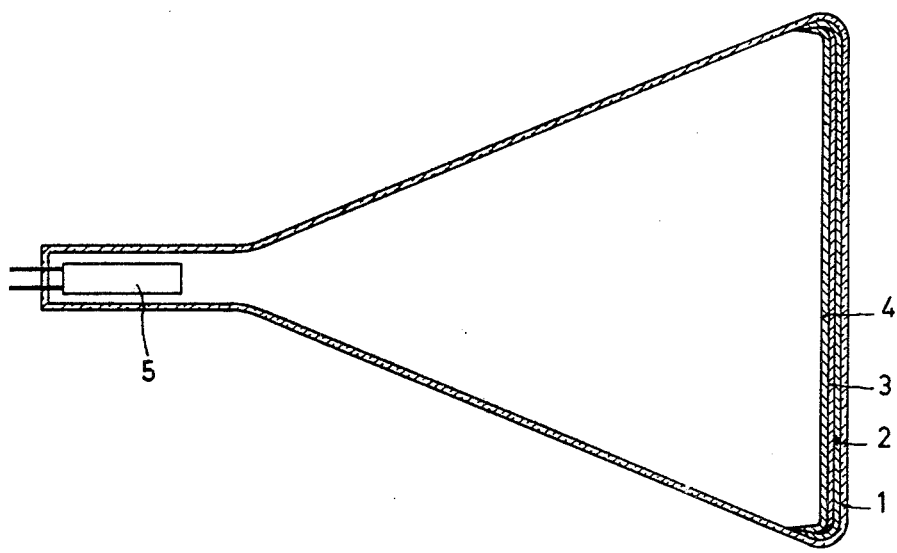

3,483,416
CATHODE-RAY TUBE WITH SILICATE LAYER BETWEEN WINDOW AND PHOSPHOR LAYER
Gerardus Antonius Wilhelmus Vermeulen, Jan Broos, and Jacobus Cornelis Gravesteijn, Emmasingel, Eindhoven, Netherlands, assignors, by mesne assignments, to U.S. Philips Corporation, New York, N.Y., a corporation of Delaware
Filed Dec. 27, 1967, Ser. No. 693,944
Claims priority, application Netherlands, Dec. 31, 1966, 6618488
Int. Cl. H01j 29/18
U.S. Cl. 313—92
4 Claims

ABSTRACT OF THE DISCLOSURE

A cathode ray tube in which a silicate layer is present between the glass envelope and the phosphor.

---

The invention relates to a cathode-ray tube the glass window of which is provided with a luminescent layer containing a zinc-cadmium sulphide which is applied by means of an organic binder.

It has been found that during operation of such a cathode-ray tube, given irregularities occur in the picture displayed. The emitted radiation of the zinc cadmium sulphide locally differs from the radiation which is emitted if the layer is not applied with the aid of an organic binder. This becomes manifest especially if the cathode-ray tube is used for displaying colour pictures, in which event the luminescent layer contains in discrete surfaces a number of differently luminescing materials. Investigations have shown that the irregularities, which also become manifest in the brightness, result from a different chemical composition of the said zinc cadmium sulphide which is due to a reaction with the glass surface occurring during baking-out of the display screen the luminescent layer of which is applied by means of an organic binder. With regard to the differences in composition of the glass surface, the reaction does not occur uniformly throughout the surface. At the temperatures commonly used for baking out the display screen (up to 440° C.), such a reaction would not occur if the luminescent layer should not be applied by means of an organic binder; due to the presence of the organic binder, the reaction proceeds at a lower temperature. The organic binder used for applying the luminescent layer is preferably a photosensitive organic binder; after being exposed to so-called "hardening radiation," the material no longer dissolves in a given solvent. During the manufacture of a colour display screen, each time those parts of a photosensitive organic binder are hardened which are situated at the areas at which the relevant luminescing material should be present.

It is known that discolouring of a display screen can be prevented by the presence of a coherent layer of a chemically inactive material, for example, kieselguhr or quartz between the luminescent layer and the glass surface. However, the application by evaporation of the layer of kieselguhr or quartz involves great difficulty and these materials are therefore not suitable for use in mass production.

According to the invention, a silicate layer is applied to the window at least at the area of the display screen between the luminescent layer and the glass. The luminescent layer then does not get into contact with the glass surface. Especially, an inorganic silicate layer is applied, since more satisfactory results are obtained therewith. Preferably, a layer of potassium silicate or sodium silicate is applied. Very satisfactory results are obtained with a layer having a thickness lying between 0.2 and 0.5$\mu$. The silicate layer can be applied in the form of a solution or suspension.

A silicate layer cannot be considered as a layer of a chemically inactive material, but it may be rendered chemically inactive by a baking-out process. However, it has been found that, if the luminescent layer is applied to a window which has been provided with a silicate layer and has been baked out, the said disadvantages with respect to a discolouring of the picture displayed are not reduced.

The improvement obtained becomes particularly manifest in green luminescing silver-activated zinc cadmium sulphide. In this case, in the absence of the silicate layer, the daylight colour of the phosphor, i.e., the colour of the light reflected from the daylight by the phosphor, would locally lie more or less in the yellow range. This is disadvantageous, since in daylight, an optimum white colour of the screen is desired.

The invention will now be described more fully with reference to a drawing, in which the figure is a sectional view of a cathode-ray tube. For the sake of clarity, only the parts essential to the invention are shown. The window 1 is internally coated with a layer of potassium silicate 2. The ratio for the potassium silicate is $K_2O:SiO_2=1:3.5$. To this layer is applied the layer of luminescent material 3 which in a colour tube is composed of discrete surfaces of differently luminescing materials. The layer 3 is coated on the side facing the gun 5 (shown diagrammatically) with an aluminium layer 4 passing electrons. The layer of potassium silicate 2 is obtained in the following manner. A 3.5 to 7% solution of potassium silicate in water is poured out into the window whilst the latter rotates. After the excess quantity has been thrown out, the window is dried until ultimate temperature of 40° C. is attained.

The table below indicates the $x$- and $y$-coordinates of the colour point of a green luminescing silver-activated zinc cadmium sulphide and also the relative brightness H, expressed by a given quantity. The zinc cadmium sulphide used contains 34% by weight of CdS. I relates to the phosphor itself. II relates to given parts of a luminescent screen which is directly applied to a glass window with the aid of polyvinyl alcohol as the organic binder. III relates to a luminescent screen which is applied by means of the same organic binder to a glass window provided in accordance with the invention with a layer of potassium silicate and which is baked out at the same temperature.

|     | $x$ | $y$ | H |
|---|---|---|---|
| I   | 230 | 550 | 240 |
| II  | 280 | 600 | 160 |
| III | 250 | 570 | 220 |

What is claimed is:

1. A cathode ray tube comprising a glass window coated with a silicate layer at its display area and a luminescent layer containing a zinc cadmium sulfide applied by means of a polyvinyl alcohol organic binder on said silicate layer.

2. The cathode ray tube of claim 1 wherein the silicate layer is an inorganic silicate layer.

3. The cathode ray tube of claim 2 wherein the silicate is potassium silicate or sodium silicate.

4. The cathode ray tube of claim 2 wherein the silicate layer has a thickness lying between 0.2 and $0.5\mu$.

References Cited

UNITED STATES PATENTS

| | | | |
|---|---|---|---|
| 2,958,002 | 10/1960 | Cusano et al. | 313—92 |
| 3,099,763 | 7/1963 | Gentry et al. | 313—92 |
| 3,225,238 | 12/1965 | Feldman | 313—92 |

JAMES W. LAWRENCE, Primary Examiner

V. LAFRANCHI, Assistant Examiner

U.S. Cl. X.R.

117—33.5